United States Patent
Zavalney et al.

(10) Patent No.: US 11,995,007 B1
(45) Date of Patent: May 28, 2024

(54) MULTI-PORT, MULTI-PROTOCOL VARIED SIZE RAM CONTROLLER

(71) Applicant: Silicon Laboratories Inc., Austin, TX (US)

(72) Inventors: Paul Ivan Zavalney, Austin, TX (US); Rejoy Roy Mathews, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/990,178

(22) Filed: Nov. 18, 2022

(51) Int. Cl.
*G06F 13/16* (2006.01)
*G06F 13/38* (2006.01)

(52) U.S. Cl.
CPC ...... *G06F 13/1605* (2013.01); *G06F 13/1694* (2013.01); *G06F 13/387* (2013.01)

(58) Field of Classification Search
CPC . G06F 13/1605; G06F 13/1694; G06F 13/387
See application file for complete search history.

(56) References Cited

U.S. PATENT DOCUMENTS

| | | | |
|---|---|---|---|
| 6,425,060 B1* | 7/2002 | Mounes-Toussi | ............................ G06F 12/0815 711/158 |
| 2007/0168908 A1* | 7/2007 | Paolucci | ............... G06F 9/3885 717/100 |
| 2015/0309725 A1* | 10/2015 | Luan | ..................... G06F 3/0659 711/150 |
| 2022/0413850 A1 | 12/2022 | Gately et al. | |
| 2022/0414049 A1 | 12/2022 | Gately et al. | |
| 2022/0414050 A1 | 12/2022 | Gately et al. | |
| 2022/0414051 A1 | 12/2022 | Gately et al. | |

* cited by examiner

*Primary Examiner* — Henry Tsai
*Assistant Examiner* — John B Roche
(74) *Attorney, Agent, or Firm* — Nields, Lemack & Frame, LLC

(57) ABSTRACT

A multi-bus protocol memory controller is disclosed. The memory controller utilizes shim circuits to translate between the various bus protocols used in the System on a Chip (SoC) and the bus protocol used by the memory controller. The use of shim circuits reduces the number of bridges required in the SoC and also increases performance. The memory controller is designed such that it may interface with any bus protocol, requiring only the design and inclusion of a shim circuit for that bus protocol.

18 Claims, 9 Drawing Sheets

MULTI-PORT, MULTI-PROTOCOL VARIED SIZE RAM CONTROLLER

FIELD

This disclosure describes a memory controller, and more particular a memory controller that supports multiple ports and multiple protocols.

BACKGROUND

A system on Chip (SOC) commonly has multiple subsystems, where each subsystem can use a different interconnect or bus protocol and different data widths on these buses. FIG. 1 shows such a SOC device. In this figure, there are several subsystems. These subsystems may include, for example, a processing subsystem, a neural processing subsystem, graphics accelerators and others. In this figure, there is a host core processor 10 that utilizes the Advanced High-Speed Bus (AHB) 12. This may be considered the system bus for the SOC. This host core processor 10 may be an ARM processor, although other types of processors may also be used. The memory which contains the instructions to be executed by this host core processor 10, which may be a FLASH, is also disposed on the AHB 12. A first subsystem 20 utilizes the OBI (open bus interface) bus 28. This first subsystem 20 may include a first subsystem core processor 21 and one or more first subsystem peripherals. To communicate with the host core processor 10, first subsystem bridge 24 is used to connect the OBI bus 28 to the AHB 12. A second subsystem 30 utilizes the AXI (Advanced eXtensible Interface) bus 39. This second subsystem 30 may include a second subsystem core processor 31 and one or more second subsystem peripherals. To communicate with the host core processor 10, second subsystem bridge 34 is used to connect the AXI bus 39 to the AHB 12.

These subsystems typically require accessing a common system RAM resource. Traditional SOC designs utilize a RAM controller that uses one type of bus protocol with a predetermined size that is accessed on the main system bus. Some RAM controllers may support multiple ports, but each port uses the same protocol. Consequently, in order to access the RAM, each subsystem must connect to the system bus via a bus-to-bus bridge Thus, in FIG. 1, the system memory 40 interfaces directly to the AHB 12. Therefore, when the first subsystem 20 or the second subsystem 30 wishes to access the system memory 40, transactions must be pass through bridges 24, 34, respectively.

These bridges introduce unwanted latency and delay, especially in the case of protocol and size translation. Additionally, this increases the contention for the AHB, which may negatively affect other subsystems.

Therefore, it would be beneficial if there were a system that enabled these different subsystems to communicate directly with the memory controller. Further, it would be advantageous if the memory controller was configured to accept different bus protocols and bus widths without the need for bus-to-bus bridges.

SUMMARY

A multi-bus protocol memory controller is disclosed. The memory controller utilizes shim circuits to translate between the various bus protocols used in the System on a Chip (SoC) and the bus protocol used by the memory controller. The use of shim circuits reduces the number of bridges required in the SoC and also increases performance. The memory controller is designed such that it may interface with any bus protocol, requiring only the design and inclusion of a shim circuit for that bus protocol.

According to one embodiment, a memory controller configured to receive memory transactions from a plurality of bus ports which use different bus protocols is disclosed. The memory controller comprises a fabric, comprising: a first plurality of demultiplexers, each demultiplexer associated with a respective bus port; and a second plurality of arbiters, each arbiter associated with a respective RAM bank; wherein each of the demultiplexers are used to route memory transactions from the respective bus port to one of the second plurality of arbiters and each arbiter is used to prioritize memory transactions from the first plurality of demultiplexers and wherein the demultiplexers and the arbiters all utilize a same fabric interconnect protocol; and one or more shim circuits, where each shim circuit is used to translate a respective bus protocol to the fabric interconnect protocol with minimal delay. In some embodiments, one of the different bus protocols comprises AHB. In some embodiments, one of the different bus protocols comprises AXI. In some embodiments, one of the different bus protocols comprises OBI. In some embodiments, the fabric interconnect protocol comprises OBI.

According to another embodiment, a System on a Chip is disclosed. The System on a Chip comprises a plurality of subsystems, utilizing different bus protocols, each in communication with a respective bus port of the memory controller described above. In some embodiments, one of the plurality of subsystems comprises a host subsystem. In some embodiments, the System on a Chip further comprises a bridge to connect two of the plurality of subsystems.

According to another embodiment, a System on a Chip is disclosed. The System on a Chip comprises a first subsystem using a first bus protocol; a second subsystem using a second bus protocol, different from the first bus protocol; and a memory controller in communication with the first subsystem and the second subsystem, wherein bridges are not used to connect the first subsystem and the memory controller and bridges are not used to connect the second subsystem and the memory controller. In some embodiments, the first subsystem comprises a host subsystem. In certain embodiments, the first bus protocol comprises AHB. In certain embodiments, the first bus protocol comprises AXI or SLAXI. In certain embodiments, the System on a Chip comprises a bridge to connect the first subsystem and the second subsystem. In some embodiments, the System on a Chip comprises a third subsystem using a third bus protocol, different from the first bus protocol and the second bus protocol, wherein bridges are not used to connect the third subsystem and the memory controller. In some embodiments, the second bus protocol comprises AHB, OBI, AXI or SLAXI. In some embodiments, the System on a Chip comprises a host subsystem, wherein the host subsystem is not in communication with the memory controller. In some embodiments, the memory controller utilizes a fabric interconnect protocol, further comprising shim circuits in the memory controller wherein each shim circuit is configured to translate a respective bus protocol to the fabric interconnect protocol with minimal delay. In certain embodiments, the fabric interconnect protocol comprises OBI.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
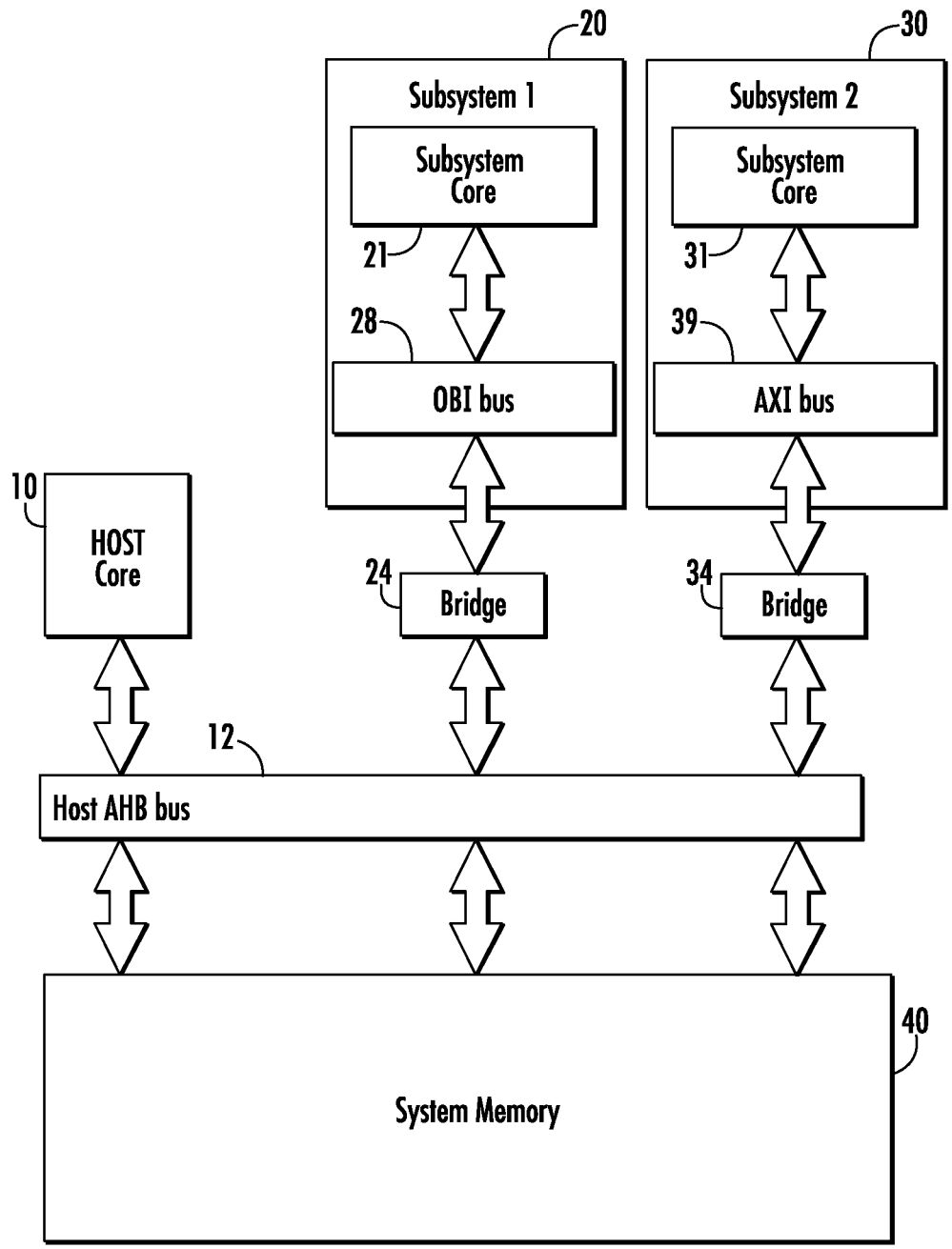
FIG. 1 is a block diagram of the internal architecture of a System on Chip (SOC) according to the prior art.
Figure 2:
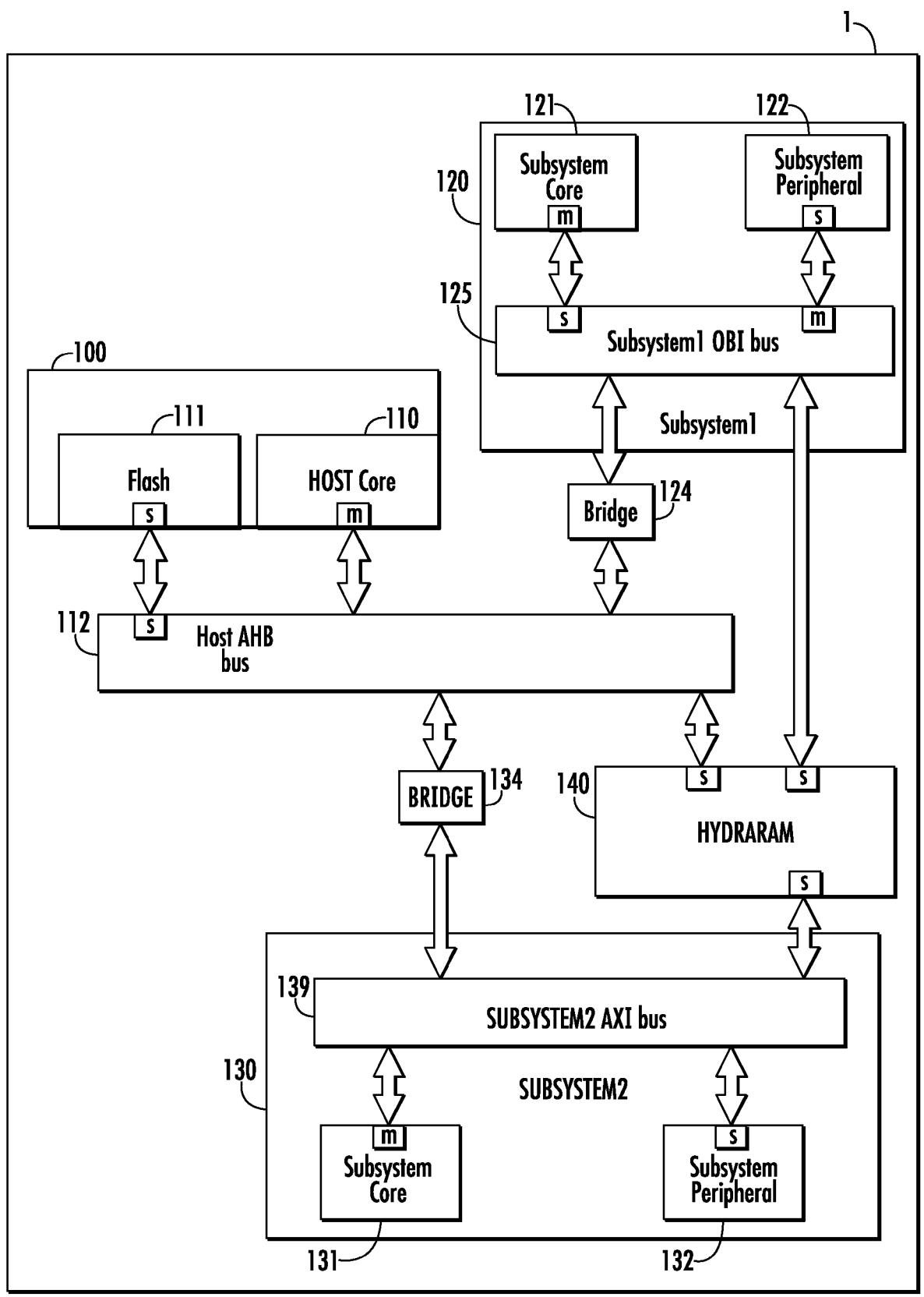
FIG. 2 is a block diagram of the internal architecture of a System on Chip (SOC) using the memory controller disclosed herein according to one embodiment.

FIG. 2 shows a block diagram of a SOC 1 according to one embodiment. The SOC 1 may be made up of a plurality of subsystems. These subsystems may include a processing subsystem, a neural processing subsystem, graphics accelerators and others. The processing subsystem 100 may also be referred to as the host subsystem. In this figure, the processing subsystem 100 includes a host processing unit 110. In some embodiments, the processing subsystem 100 utilizes an ARM-based processing unit, and may communicate externally using the ARM Advanced Microcontroller Bus Architecture (AMBA) Advanced High-Speed Bus (AHB). In other embodiments, the processing subsystem 100 may utilize a different processing unit. In these embodiments, OBI (Open Bus Interface), AXI (Advanced eXtensible Interface) or SLAXI (Silicon Labs Advanced eXtensible Interface may be employed.

The following description assumes that the host processing unit 110 is an ARM-based processing unit. However, as described above, a different processing unit and bus protocol may be used. Furthermore, the following is applicable to any subsystem that utilizes AHB. The AHB 112 includes an Address bus and a Data bus. The Address bus may be 32 bits wide, while the Data bus may be 32 bits, 64 bits or 128 bits. Transactions occur in two phases; during the address phase, the master, which is typically the host processing unit 110, supplies an address on the Address bus. During the next phase, or data phase, the master supplies data for a write operation or receives data for a read operation on the Data bus. The AHB 112 also supports stalls, such that the slave can delay the transaction by deasserting the Ready signal.

The host processing unit 110 may be connected to other components using the AHB 112, such as a FLASH memory 111 and other components. The FLASH memory 111 and other components typically act as slaves during AHB transactions.

Additionally, another subsystem, referred to as first subsystem 120 may include a first subsystem core processor 121 and first subsystem peripherals 122. The first subsystem 120 utilizes the OBI (open bus interface) bus 125. OBI bus 125 is commonly used with RISC-V processors. OBI protocol defines two channels, an address channel, where address and write data are presented, and a response channel where read data and write responses are presented. During write cycles, a device will present both the address and the write data on the same clock cycle. The presence of a second channel allows additional transactions to start before the original read data is returned.

To communicate with the host processing unit 110, first subsystem bridge 124 is used to connect the OBI bus 125 to the AHB 112.

Another subsystem, referred to as second subsystem 130, utilizes the AXI (Advanced eXtensible Interface) bus 139. This second subsystem 130 may include a second subsystem core processor 131 and one or more second subsystem peripherals 132. AXI is a protocol developed by ARM. This protocol includes five channels; write address channel, write data channel, write response channel, read address channel, and read data channel. Each channel is independent of the others and supports a two-way handshake mechanism. AXI may have a 32, 64 or 128 bit wide data bus.

To communicate with the host processing unit 110, second subsystem bridge 134 is used to connect the AXI bus 139 to the AHB 112.

While FIG. 2 shows AXI, OBI and AHB busses, it is understood that there may be other bus protocols that are utilized within the SOC. For example, Silicon Labs defined a variation of AXI known as SLAXI, which has only 4 channels, where the two address channels defined in AXI are combined into a single channel. These different bus protocols may be referred to collectively as busses or bus protocols.

Further, as noted above, the bus protocols may be different than shown in FIG. 2. For example, the host subsystem may utilize AXI or SLAXI in other embodiments. Further, the first and second subsystems may use bus protocols other than those shown in FIG. 2. Additionally, there may be more or fewer subsystems in the SoC 1.

Advantageously, the RAM controller 140 is able to accommodate each of these different bus protocols. Therefore, as shown in FIG. 2, the AHB 112, the OBI bus 125 and the AXI bus 139 all attach directly to the RAM controller 140.

Figure 3:
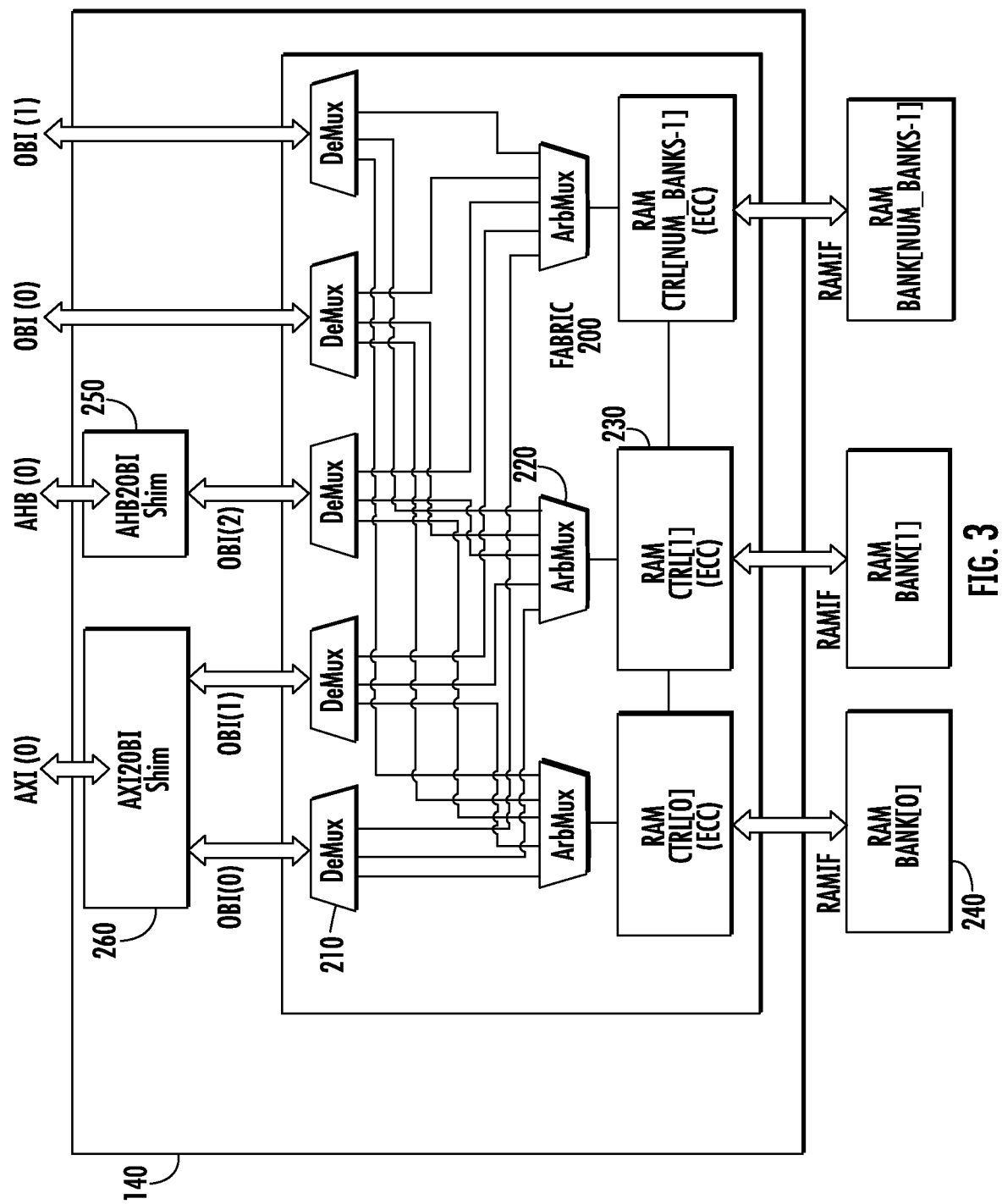
FIG. 3 shows a block diagram of the memory controller.

FIG. 3 shows a block diagram of the RAM controller 140. The RAM controller 140 includes a fabric 200. The fabric 200 is used to route data to and from the appropriate RAM bank and bus port, where each bus port connects to a respective host or subsystem bus. The fabric 200 includes a plurality of demultiplexers 210. In this embodiment, one demultiplexer 210 corresponds to each 32-bit bus port. In these embodiments, the fabric 200 is configured to operate using 32 bit wide data paths. More specifically, the fabric 200 is configured to operate using a width that is the smallest bus port width or smallest individually addressable memory width. Thus, if memory can only be accessed in 64 bit blocks and all of the bus ports were at least 64 bits wide, the fabric 200 may operate using 64 bit wide data paths.

However, as noted above, in this embodiment, the fabric 200 uses 32 bit wide data paths. Thus, if one or more of the bus ports utilize 64-bit data channels, those 64-bit bus ports will be allocated 2 demultiplexers 210. In FIG. 3, it is shown that the AXI bus port has a 64-bit data channel and therefore, these two bus ports are allocated two demultiplexers 210. FIG. 3 also shows two separate 32 bit wide data channels, both which utilize OBI. If, however, a 64 bit OBI data channel was used, the RAM controller 140 would include an additional shim circuit that receives the 64 bit OBI and generates two 32 bit wide channels, each in communication with a respective demultiplexer 210.

The purpose of the demultiplexer 210 is to determine the destination of the data transaction. Thus, each demultiplexer 210 has a plurality of outputs, wherein that plurality is equal to the number of RAM banks 240 that are present. A RAM bank 240 is defined as one or more memory devices that are treated as a single unit.

In other words, the demultiplexer 210 routes a transaction from its respective bus port to the arbiter 220 associated with the intended RAM bank 240.

Each RAM bank 240 has a respective arbiter 220. The purpose of the arbiter 220 is to receive transaction requests from the various demultiplexers 210, and prioritize these requests such that the highest priority request gains access to the RAM bank 240.

In certain embodiments, control logic 230 is disposed between each arbiter 220 and its respective RAM bank 240. This control logic 230 is used to generate error correcting codes (ECC) for all data being written to the RAM bank 240. The control logic 230 is also used to ensure the validity of any data read from the RAM bank 240 by verifying the ECC and performing any error corrections that are required. The control logic 230 is also used to generate the timing signals used by the RAM bank 240. The implementation of this control logic 230 is well known and not described herein.

Figure 4:
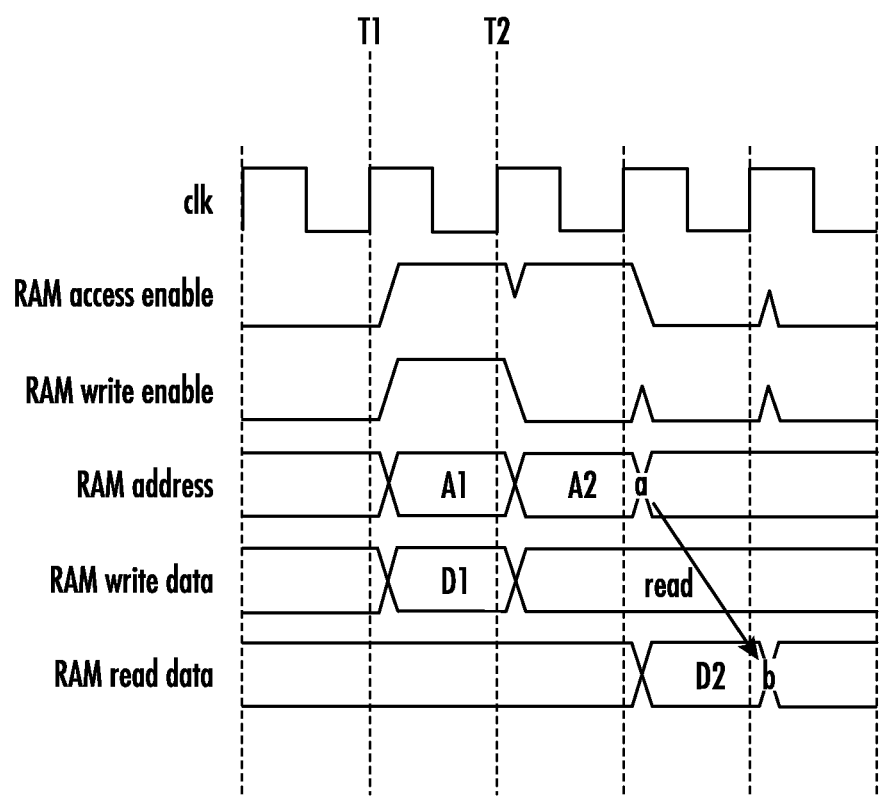
FIG. 4 is a timing diagram showing the operation of the RAM interface.

In this fabric 200, a single bus protocol is employed. In one embodiment, the fabric 200 utilizes the OBI protocol. This protocol may be selected because it closely resembles the RAM interface, which is shown in FIG. 4. The bus protocol utilized by the fabric 200 may be referred to as the fabric interconnect protocol. In other embodiments, the fabric interconnect protocol may be AXI, SLAXI or AHB.

FIG. 4 shows the operation of the RAM controller 140 and the external RAM. In this figure, a write cycle is followed by a read cycle. Note that for the write cycle, which occurs at time T1, the RAM address (A1) and RAM write data (D1) are presented by the RAM controller 140 at the same time. For the read cycle, which begins at time T2, the RAM controller 140 presents the RAM address (A2). The RAM presents the read data (D2) during the following clock cycle.

To allow the RAM controller 140 to operate with multiple bus protocols, a plurality of shim circuits are used. FIG. 3 shows an AHB to OBI shim circuit 250, and an AXI to OBI shim circuit 260. Note that if different subsystems of the SoC 1 used other bus protocols, such as SLAXI, additional or different shim circuits may be utilized.

A shim circuit is used to translate from one bus protocol to another bus protocol. However, a shim circuit is different than a bridge. A bridge incurs a latency of usually one clock cycle to ensure timing isolation of critical timing signals between the protocols. On the other hand, a shim circuit will not incur a latency on the control signals (unless mandated by the protocols) and therefore, timing critical signals are passed between the two bus protocols within the same clock cycle.

Figure 5:
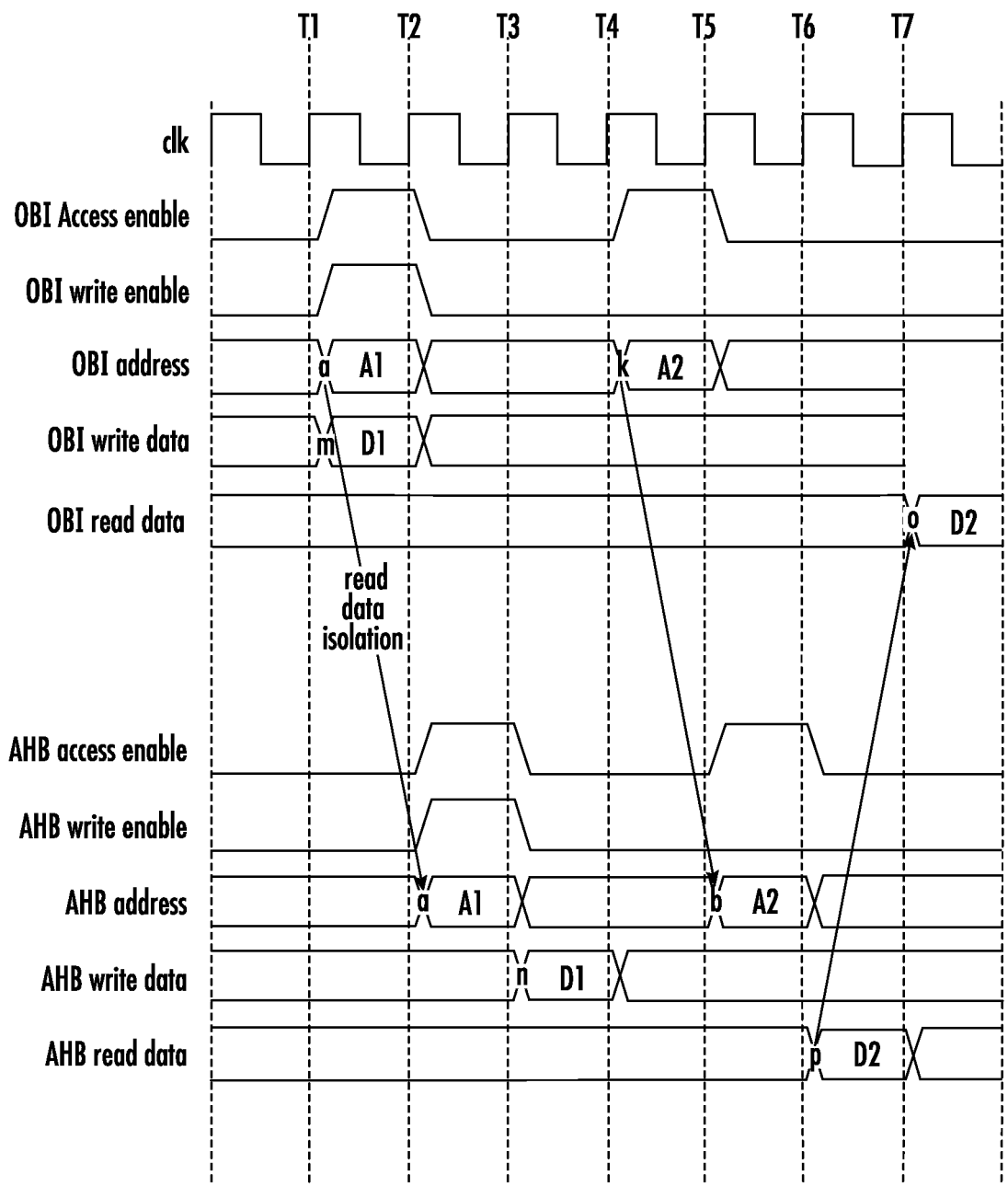
FIG. 5 is a timing diagram showing the operation of an OBI to AHB bridge.
Figure 6:
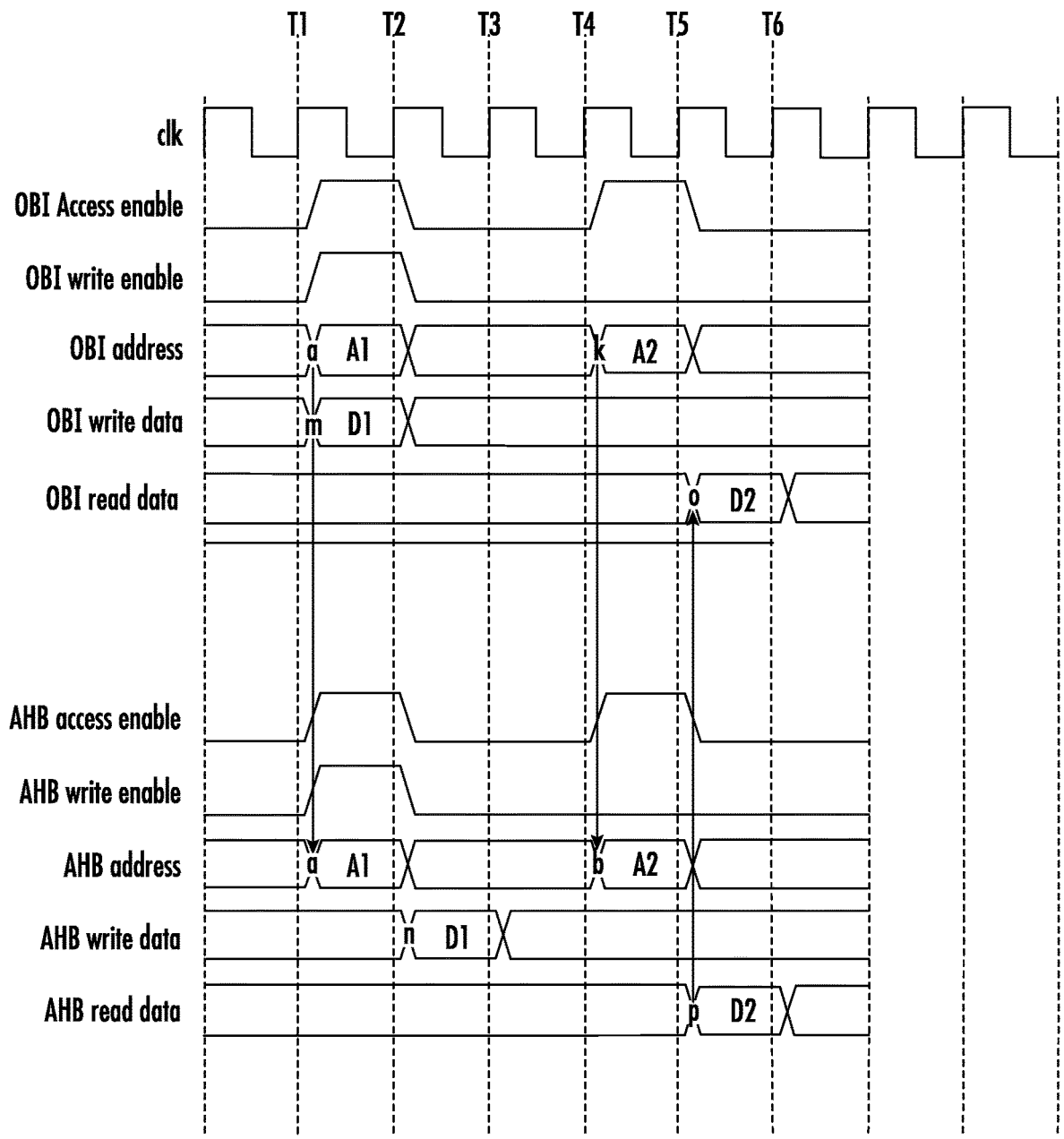
FIG. 6 is a timing diagram showing the operation of an OBI to AHB shim circuit.

FIGS. 5 and 6 demonstrate the difference between a bridge and a shim circuit. In FIG. 5, a bridge is shown, connecting an OBI bus and the AHB. Note that a write cycle begins at time T1, where the OBI master asserts the address, the write data, the access enable and the write enable. Further, the bridge delays the presentation of the address, the access enable and the write enable on the AHB until time T2. The write data is presented at T3, since the AHB requires the write data to be presented one clock after the address. Thus, the write cycle is not completed until the end of time T3. A read cycle begins at time T4. Although the address and the access enable is present on the OBI bus during time T4, it is not presented to the AHB until time T5. Likewise, although the read data is available on the AHB during time T6, it is not presented to the OBI bus until time T7.

FIG. 6 shows the same two operations performed using a shim circuit. As above, the write cycle begins at time T1, where the OBI master asserts the address, the write data, the access enable and the write enable. However, unlike the bridge, the shim circuit passes the address, the access enable and the write enable to the AHB immediately (during time T1). The write data is presented during time T2, as required by AHB. Thus, the write cycle is done by the end of time T2, which is one clock cycle sooner than occurred with the bridge. As before, the read cycle begins at time T4. However, the shim circuit passes the address and the access enable immediately to the AHB during T4. Thus, the read data is now available on the AHB during time T5, and is passed immediately to the OBI bus. Thus, the read cycle is done at the end of time T6.

Note that, unlike the bridge, the shim circuit passes control signals, address and data as soon as they are available, unless otherwise mandated by the bus protocols. In contrast, a bridge introduces at least one clock cycle delay in each operation. Stated differently, a shim circuit presents information from the first bus to the second bus as soon as permitted by the protocol of the second bus. Thus, in many cases, address, data and control signals are presented by the shim circuit on the second bus during the same clock period that they first appeared on the first bus.

Figure 7:
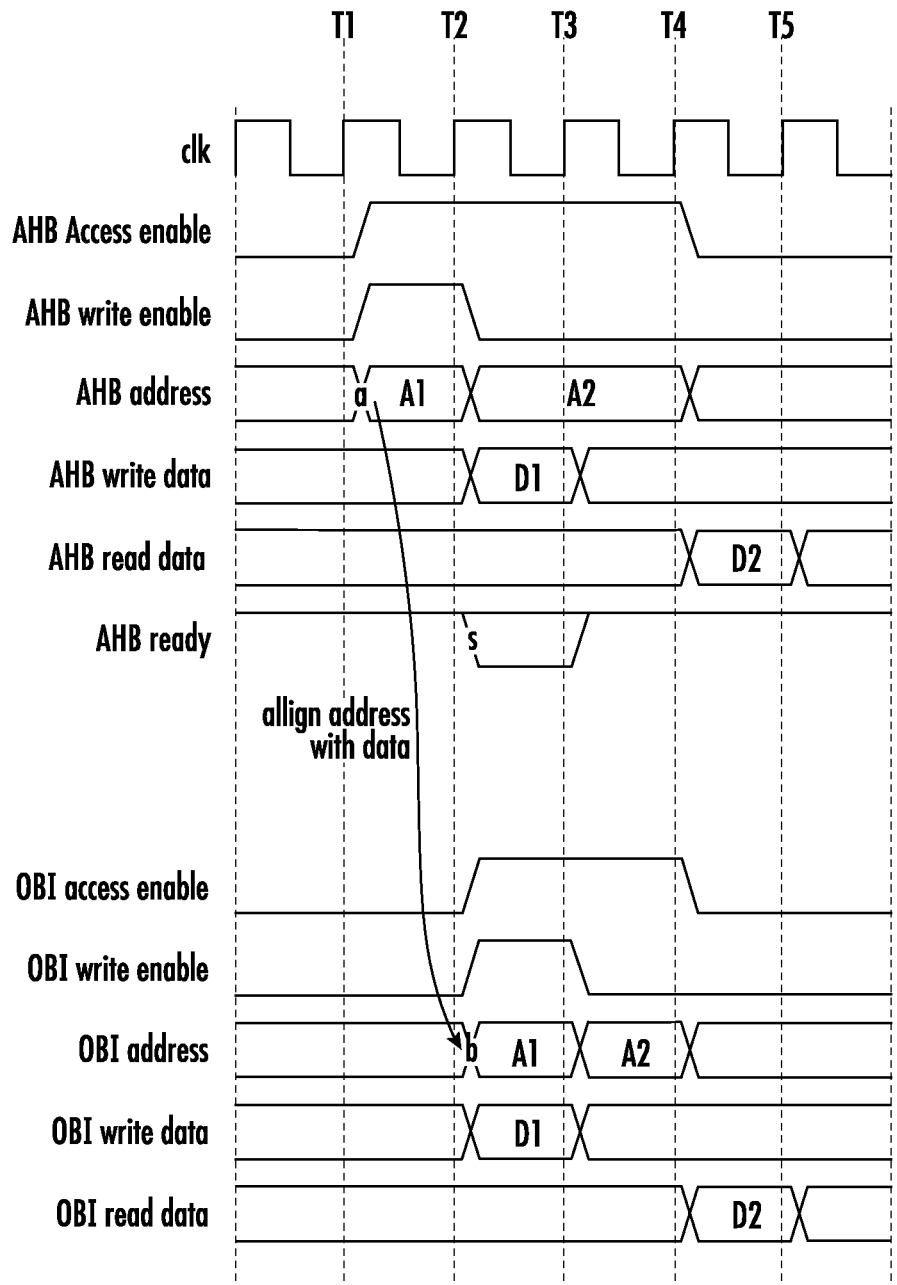
FIG. 7 is a timing diagram showing the operation of the AHB to OBI shim circuit.

Having described the difference between a shim circuit and a bridge, FIG. 7 shows a timing diagram showing the operation of the AHB to OBI shim circuit 250 in FIG. 3. At time T1, the AHB master asserts the access enable, the write enable and the address. Since the OBI bus protocol requires the write data to be present with the address, the AHB to OBI shim circuit 250 latches the address and control signals and does not pass them to the OBI bus. During time T2, the write data is now present, so the AHB to OBI shim circuit 250 passes the address, the write data, the access enable and the write enable to the OBI bus. Thus, the write data appears on the OBI bus during the same clock where is first appeared on the AHB. As noted above, the RAM controller 140 uses OBI since it is the same format as the RAM interface. At the end of time T2, the write cycle is complete. Note that the use of a bridge would have required at least one additional clock cycle to complete the write operation. At time T2, the AHB master presents an address for a read operation. Note that this occurs at the same time that the write data for the first operation is being presented. The AHB to OBI shim circuit 250 holds the second address since the write operation for the first address is still ongoing. During time T3, the AHB to OBI shim circuit 250 presents the second address and deasserts the write enable signal, thus communicating that a read operation is requested. At time T4, the read data is available on the OBI bus and is presented immediately on the AHB.

Figure 8:
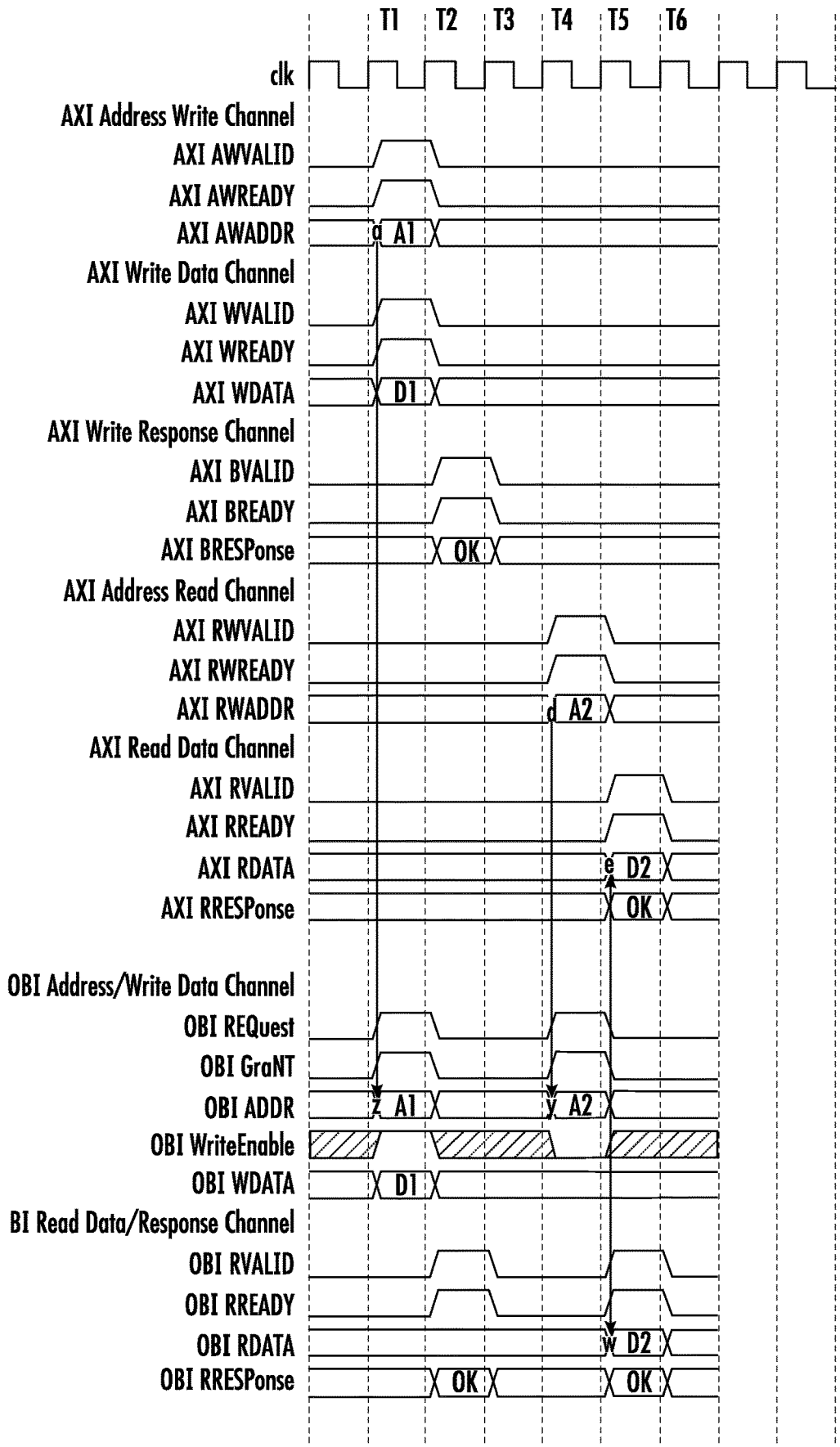
FIG. 8 is a timing diagram showing the operation of the AXI to OBI shim circuit.

FIG. 8 shows the operation of the AXI to OBI shim circuit 260. At time T1, the write cycle is initiated by the AXI master. The AXI master asserts the write address, the write data, the Address Valid signal, the Data Valid signal and other control signals. In response, the AXI to OBI shim circuit 260 immediately passes the write address, the write data and the write enable signal to the OBI bus. Note that these signals are passed without a clock delay, as would be encountered if a bridge was used. Thus, the OBI write cycle is completed during the same cycle in which the AXI write cycle began. At time T4, the read cycle is initiated by the AXI master. The AXI master asserts the read address, the Address Valid signal, and other control signals. In response, the AXI to OBI shim circuit 260 immediately passes the read address, and the control signals to the OBI bus. Note that these signals are passed without a clock delay. At some later time, the read data is available on the OBI bus. In FIG. 8, this occurs during time T5, although it may be later. In response, the AXI to OBI shim circuit 260 immediately passes the read data and the read response signal to the AXI master. Again, the read data is passed without a clock delay. The read cycle is then complete. Note that delays can be introduced as necessary by the shim circuit. For example, there may be a delay from the AXI master requesting read data and the RAM controller 140 allowing access to the RAM bank 240. In this scenario, the AXI to OBI shim circuit 260 will not assert the read ready signal until the data is available from the RAM bank 240.

Figure 9:
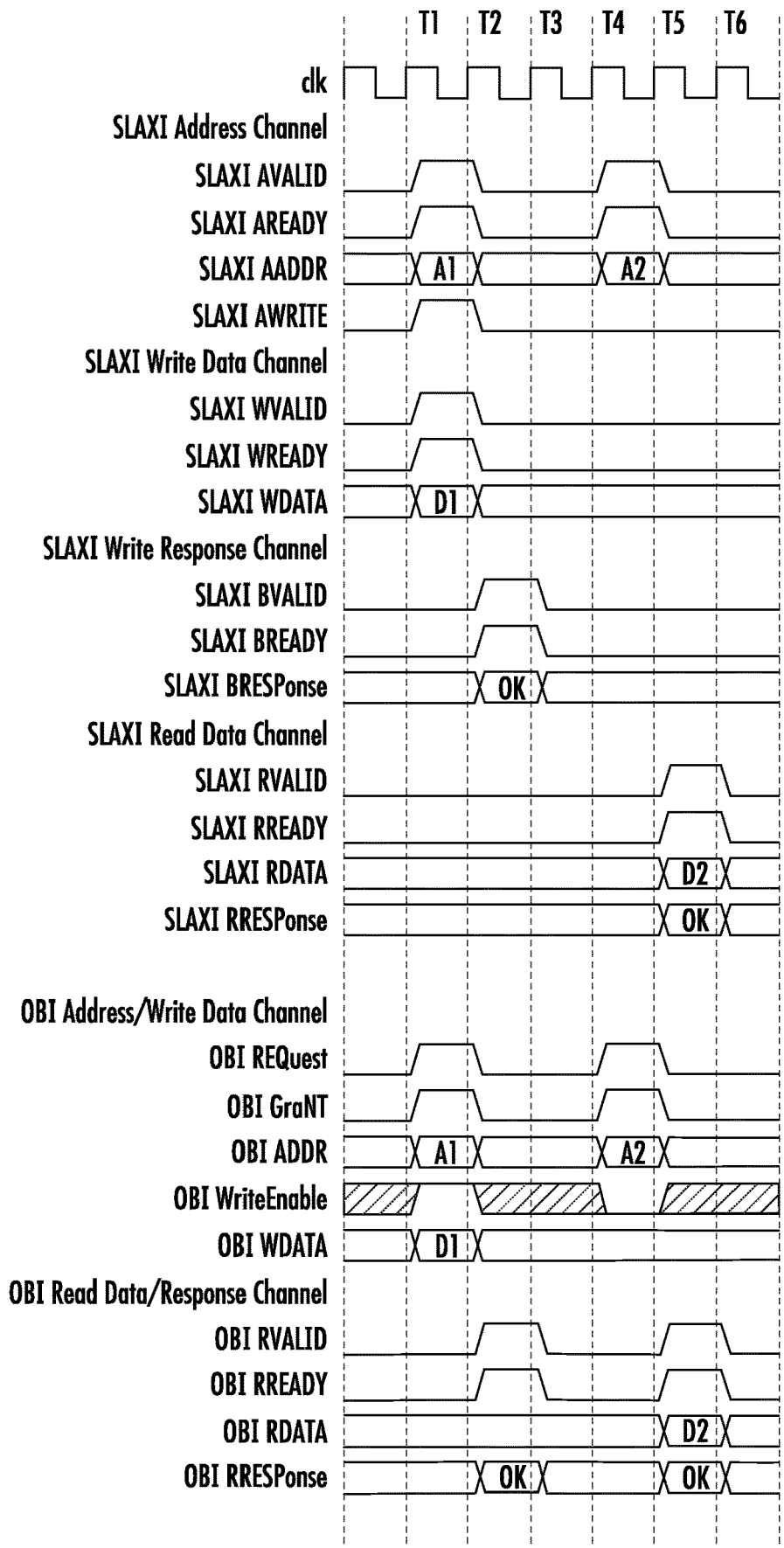
FIG. 9 is a timing diagram showing the operation of the SLAXI to OBI shim circuit.

Although not shown in FIG. 2 or FIG. 3, one of the subsystems may implement the SLAXI bus protocol. SLAXI is similar to AXI, but consolidates the read address and write address channels into a signal channel. FIG. 9 shows the timing diagram of a SLAXI to OBI shim circuit. This operation is nearly identical to that of the AXI to OBI shim circuit 260 in FIG. 8. However, in SLAXI, the read address and the write address are presented on the same channel. Thus, during time T1, the write cycle is initiated by the SLAXI master. The SLAXI master asserts the address, the write data, the Address Valid signal, the Data Valid signal and other control signals. In response, the SLAXI to OBI shim circuit immediately passes the write address, the write data and the write enable signal to the OBI bus. Note that these signals are passed without a clock delay. The OBI write cycle is completed during the same cycle in which the SLAXI write cycle began. At time T4, the read cycle is initiated by the SLAXI master. The SLAXI master asserts the address, the Address Valid signal, and other control signals. In response, the SLAXI to OBI shim circuit immediately passes the address, and the control signals to the OBI bus. Note that these signals are passed without a clock delay. At some later time, the read data is available on the OBI bus. In FIG. 9, this occurs during time T5, although it may be later. In response, the SLAXI to OBI shim circuit passes the read data and the read response signal to the SLAXI master. Again, the read data is passed without a clock delay. The read cycle is then complete. Note that, as above, delays can be introduced as necessary by the shim circuit. For example, there may be a delay from the SLAXI master requesting read data and the RAM controller 140 allowing access to the RAM bank 240. In this scenario, the SLAXI to OBI shim circuit will not assert the read ready signal until the data is available from the RAM bank 240.

Shim circuits for other bus protocols can also easily be created. Thus, it is possible to implement this RAM controller for many different SoC configurations with minimal alteration. For example, by inputting the number of RAM banks 240 that are to be used, the number of arbiters 220 and control logic 230 can be readily determined. The number of AXI subsystems and their widths determine the number of AXI to OBI shim circuits 260 that are needed. Likewise, the number of AHB subsystems and their widths determine the number of AHB to OBI shim circuits 250 that are needed. Additionally, the number of SLAXI subsystems and their widths determine the number of SLAXI to OBI shim circuits that are needed. Similarly, if other bus protocols are used in the SoC, the number of shim circuits needed for those bus protocols can be readily determined. Finally, the number of demultiplexers 210 can be determined based on the number of shim circuits.

While FIG. 2 shows the host subsystem in communication with the RAM controller 140, other embodiments are possible. For example, in another embodiment, the host subsystem may not be in communication with the RAM controller 140. In this embodiment, the RAM banks 240 may be used as a communication mechanism between the other subsystems in the SoC 1.

The present system and method has many advantages. First, by creating a multi-protocol bus controller, the number of bridges within the SoC may be reduced. This saves valuable real estate on the device and also reduces power consumption. Further, as explained above, the use of shim circuits, rather than bridges, also increases performance by minimizing the delays incurred in translating from one bus protocol to another. Further, the memory controller can readily be modified to accommodate other bus protocols by the design and incorporation of a new shim circuit specific to that bus protocol.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A memory controller configured to receive memory transactions from a plurality of bus ports which use different bus protocols, comprising:
    a fabric, comprising:
        a first plurality of demultiplexers, each demultiplexer associated with a respective bus port; and
        a second plurality of arbiters, each arbiter associated with a respective RAM bank;
        wherein each of the demultiplexers are used to route memory transactions from the respective bus port to one of the second plurality of arbiters and each arbiter is used to prioritize memory transactions from the first plurality of demultiplexers and wherein the demultiplexers and the arbiters all utilize a same fabric interconnect protocol; and
    one or more shim circuits, where each shim circuit is used to translate a respective bus protocol to the fabric interconnect protocol with minimal delay.

2. The memory controller of claim 1, wherein one of the different bus protocols comprises Advanced High-Speed Bus (AHB).

3. The memory controller of claim 1, wherein one of the different bus protocols comprises Advanced eXtensible Interface (AXI).

4. The memory controller of claim 1, wherein one of the different bus protocols comprises Open Bus Interface (OBI).

5. The memory controller of claim 1, wherein the fabric interconnect protocol comprises Open Bus Interface (OBI).

6. A System on a Chip, comprising:
    a plurality of subsystems, utilizing the different bus protocols, each in communication with a respective bus port of the memory controller of claim 1.

7. The System on a Chip of claim 6, wherein one of the plurality of subsystems comprises a host subsystem.

8. The System on a Chip of claim 6, further comprising a bridge to connect two of the plurality of subsystems.

9. A System on a Chip comprising:
- a first subsystem using a first bus protocol;
- a second subsystem using a second bus protocol, different from the first bus protocol; and
- a memory controller in communication with the first subsystem and the second subsystem, wherein bridges are not used to connect the first subsystem and the memory controller and bridges are not used to connect the second subsystem and the memory controller.

10. The System on a Chip of claim 9, wherein the first subsystem comprises a host subsystem.

11. The System on a Chip of claim 10, wherein the first bus protocol comprises Advanced High-Speed Bus (AHB).

12. The System on a Chip of claim 10, wherein the first bus protocol comprises Advanced eXtensible Interface (AXI) or Silicon Labs Advanced eXtensible Interface (SLAXI).

13. The System on a Chip of claim 10, further comprising a bridge to connect the first subsystem and the second subsystem.

14. The System on a Chip of claim 9, further comprising a third subsystem using a third bus protocol, different from the first bus protocol and the second bus protocol, wherein bridges are not used to connect the third subsystem and the memory controller.

15. The System on a Chip of claim 9, wherein the second bus protocol comprises Advanced High-Speed Bus (AHB), Open Bus Interface (OBI), Advanced eXtensible Interface (AXI) or Silicon Labs Advanced eXtensible Interface (SLAXI).

16. The System on a Chip of claim 9, further comprising a host subsystem, wherein the host subsystem is not in communication with the memory controller.

17. The System on a Chip of claim 9, wherein the memory controller utilizes a fabric interconnect protocol, further comprising shim circuits in the memory controller wherein each shim circuit is configured to translate a respective bus protocol to the fabric interconnect protocol with minimal delay.

18. The System on a Chip of claim 17, wherein the fabric interconnect protocol comprises Open Bus Interface (OBI).

\* \* \* \* \*